Patented Apr. 1, 1924.

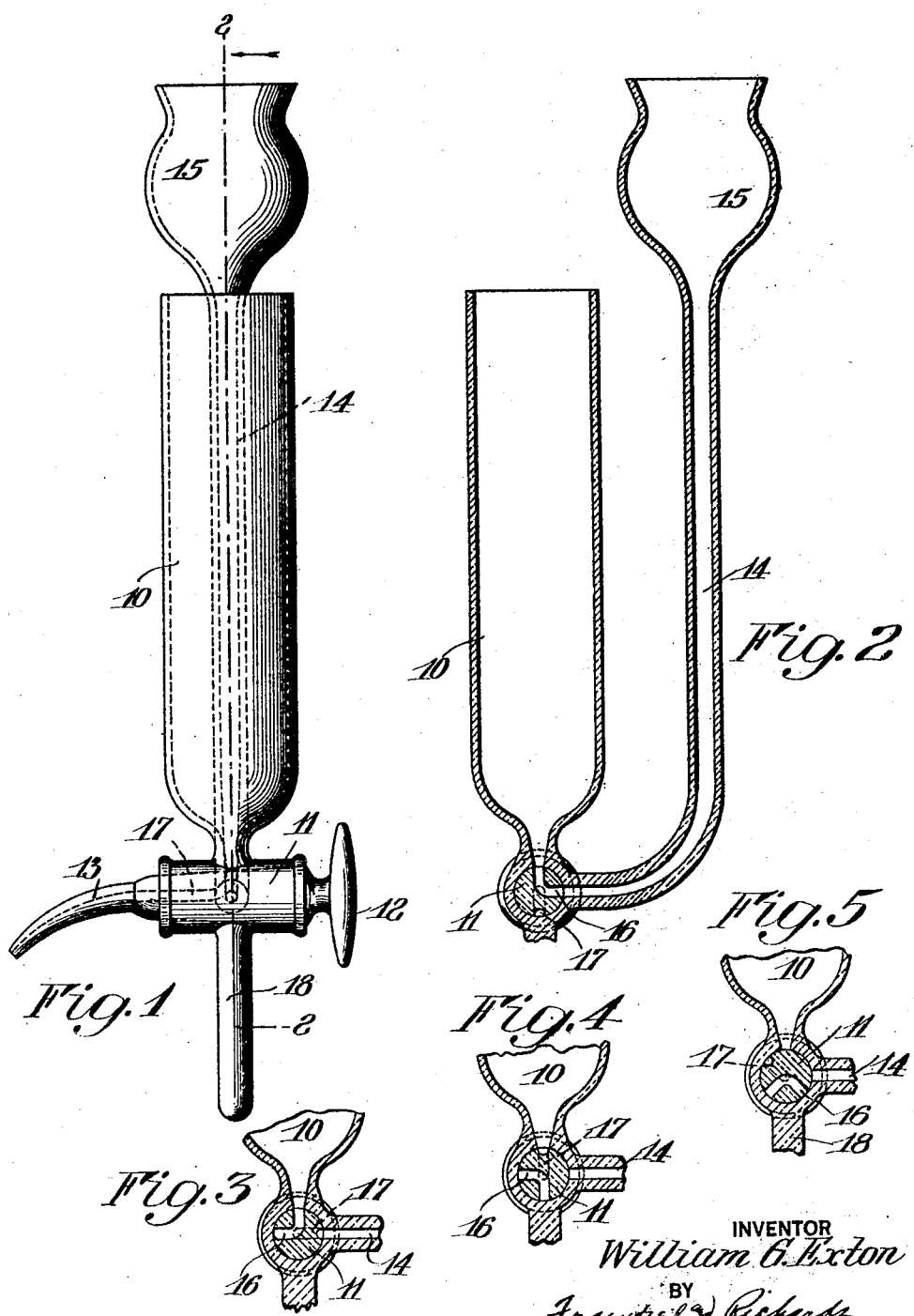

1,488,747

UNITED STATES PATENT OFFICE.

WILLIAM G. EXTON, OF NEW YORK, N. Y.

MIXTURE METER.

Application filed September 15, 1920. Serial No. 410,474.

*To all whom it may concern:*

Be it known that I, WILLIAM G. EXTON, a citizen of the United States, residing at New York, in the county of New York and State of New York, have invented certain new and useful Improvements in Mixture Meters; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to an improvement in the means and method for the determination of specific gravity of a liquid when only a relatively small amount thereof is present. One object of my invention is to provide apparatus for determining the specific gravity of a liquid no matter how relatively small the amount thereof.

Another object is to provide a convenient means for readily mixing two liquids of different densities until the mixture is of the same specific gravity as that of a liquid to be tested, the latter being immiscible with the mixture.

A further object is to provide an advantageous method of performing this determination of the specific gravity of a relatively small quantity of liquid to be tested. To these and other ends the invention consists in certain improvements and combinations of parts, all as will be hereinafter more fully described, the novel features being pointed out in the claims at the end of the specification.

In the drawings:

Figure 1 represents a side view of my improved apparatus.

Figure 2 represents a section on the line 2—2 of Figure 1 with the valve connecting the container and vessel.

Figure 3 is a section of the valve in position for emptying the container.

Figure 4 shows the position of the valve for emptying the vessel while Figure 5 illustrates the position of the valve when closing both the container and vessel.

Similar reference-characters throughout the several views indicate the same parts.

My invention resides in a means for and the method of measuring the specific gravity of a fluid, such for example as urine, when only a relatively small portion is available to be tested.

Referring to the drawings, a vessel 10, preferably of glass or other transparent material has provided in the bottom thereof a two-way cock or valve 11 which is also in communication with the passageway 14, which extends to the container 15, the latter being suitably elevated above the vessel 10 in order that the liquid in the same may have a greater head or pressure upon the valve 11 than does the liquid in the vessel 10. By having the passageway 14 of relatively small cross-section, as shown, the amount of liquid required to fill the container to the requisite height is considerably less than that which would be required were the container 15 of uniform diameter throughout. The container 15, passageway 14, and cock 11 are all of glass or other suitable material. Two passageways, 16 and 17, are provided in the valve 11, one of which, 16, connects the vessel and container when the valve is in the position shown in Figure 2, while the other one 17, is an outlet passageway in communication with a spout 13, and is adapted when the valve is placed in the position shown in Figure 3, to drain the container 15 and passageway 14. When the valve is in the position indicated by Figure 4, the passageway 17 therein is adapted to drain the vessel 10, when the valve is placed in the position indicated in Figure 5, both the vessel and container are closed, thus it will be seen that the valve has four positions shown by Figures 2 to 5 inclusive. A handle 12 or other appropriate means for turning the valve may be provided. Any convenient form of supporting means for the apparatus, such as the projection 18 may be provided.

In general the operation is carried on as follows:—

The vessel 10 is filled with a convenient amount of relatively heavy liquid, such as carbon tetrachloride, chloroform or other suitable liquid, which may be termed the measuring liquid. Into this measuring liquid is placed a relatively small quantity of liquid to be tested, even a drop being sufficient in amount.

In order to properly carry out the method, the measuring liquid must be immiscible with the liquid to be tested. Preferably it is desirable to use for the measuring liquid one that is known to be heavier or of greater density than the liquid to be tested, and consequently the second liquid, or liquid to be tested, being lighter in density, will either float upon or will be immersed in the upper portion of the measuring liquid. Of course it will be understood that when filling either the vessel 10 or container 15, the valve 11 should be in the closed position as indicated in Figure 5. The container 15 is now filled with a third liquid, such as benzol or other petroleum distillate, or other appropriate liquid, which is lighter in weight or density than either the measuring liquid or liquid to be tested. This third liquid must be immiscible with the liquid to be tested, while being capable of quickly intermixing with the measuring liquid so as to modify the density of the latter. On turning the valve 11 from the position shown in Figure 5 in a counter clockwise direction until the same is in the position indicated in Figure 2 the container 15 will be connected in communication with the vessel 10. Since the liquid in the container 15 has a greater head or pressure at the valve it will therefore slowly flow into the vessel 10 at the bottom thereof, whereupon the third liquid mixes with the first liquid. As the lighter liquid from the container 15 mixes with the heavier liquid in the vessel 10, the mixture becomes less dense or of less specific gravity, until the second or liquid to be tested floating on or immersed in the upper portion of the measuring liquid sinks, which fact is an indication that the density or specific gravity of the mixture is approaching that of said second liquid or liquid to be tested. When the liquid to be tested sinks to a level approximately midway between the top and bottom of the measuring liquid, the valve 11 is then closed to the position indicated in Figure 5 since the mixture of first and third liquid in the vessel 10, is now of the same specific gravity as the liquid to be tested, consequently the mixture may have its specific gravity determined in any convenient manner, preferably by the introduction of the usual hydrometer to afford a quick and accurate determination of its density, which will thus conform to and indicate the density or specific gravity of the liquid to be tested.

While it has been stated that the first liquid is relatively heavy with respect to the liquid to be tested it will be understood, that a mixture of the first and third liquids may be initially provided in the vessel 10 so proportioned as to provide a gravity adapted to the range of the liquid to be tested and preferably heavier than the latter so that by operation of the device in the manner above described, the introduction of the lighter third liquid from the container 15 will quickly bring the resultant mixture to the state of density wherein it balances with the density of the liquid to be tested as indicated by the fact that the latter liquid is suspended in equilibrium in a position midway between the top and bottom of the mixture in the vessel 10. Since the liquid to be tested is immiscible with the measuring liquid the same may be recovered from the latter by pipetting out the drops thereof whereupon the measuring mixture may be discharged from the vessel 10 through an intervening filter into a stock-bottle and the content of lighter liquid in the container 15 may be separately discharged into a suitable storage bottle.

Among the advantages of my invention may be enumerated the fact that the third liquid slowly introduced into the bottom of the vessel 10 gives opportunity for the first and third liquids to mix well. Having the passageway 14 of relatively small cross-section is effective in producing the necessary head or pressure while at the same time lessening quantity of liquid necessary to fill the container 15. My method greatly facilitates a quick hydrometer test when only a relatively small portion of liquid to be tested is available. Throughout the specification and claims where the terms heavy and light weight are used, it will be understood that these terms do not apply to the relative weights of the entire volumes, but only to the weight per unit volume.

I claim: —

1. The combination with a liquid receiving vessel, of a liquid container, means providing a passageway interconnecting the bottom of said vessel with said container, said container being elevated to give the liquid therein a greater head than the liquid in the vessel, and a rotary two-way valve at the bottom of said vessel intermediate the latter, and said passageway adapted when in one position to open the passageway for communication between the vessel and container, or when in another position to prevent outflow of liquid from either the vessel or container, or adapted to be positioned to drain either the vessel or container separately.

2. The combination with a liquid receiving vessel, of a liquid container, means providing a passageway interconnecting the bottom of said vessel with said container, said container being elevated to give the liquid therein a greater head than the liquid in the vessel, and a rotary valve intermediate the bottom of said vessel and said passageway, said valve having two channels therein, one of which is adapted to connect the vessel and container, and the other of which is adapted to provide external communication with either the vessel or the container.

3. A liquid mixing vessel provided therein with a liquid, and a quantity of a lighter weight liquid to be tested, said first mentioned liquid being immiscible with the liquid to be tested, means having a passageway provided with a valve therein, a container connected with the bottom of the vessel by the passageway and its valve, and said container being provided with a third liquid of less specific gravity than either of the two aforementioned liquids but which has a greater head or pressure on the valve than the first and second mentioned liquids, whereby when said valve is turned to open communication between said container and vessel the third liquid will rise slowly in the vessel and mix with the first mentioned liquid until the specific gravity of the mixture of said first and third liquids balances with that of the second liquid.

4. A liquid mixing vessel provided therein with carbon tetrachloride and a smaller quantity of another liquid to be tested, which is of less specific gravity than the carbon tetrachloride and which is immiscible with the latter, means providing a passageway, a valve in said passageway, and a container connected with the bottom of the vessel by the passageway and filled with a light petroleum distillate under a greater head upon the valve than the carbon tetrachloride, whereby when said valve is turned to allow communication between the container and vessel, the petroleum distillate is adapted to slowly rise and mix with the carbon tetrachloride.

5. The method of measuring the specific gravity of a relatively small portion of a liquid which comprises, immersing the same in a heavier liquid, slowly introducing a third liquid of less specific gravity than either of the first two mentioned liquids at the bottom of the heavier liquid until the mixture of the two becomes of the same density as that of the liquid to be tested, when said liquid to be tested is suspended approximately midway the top and bottom of the mixture, stopping the flow of the third liquid into the bottom of the heavier liquid, and measuring the specific gravity of the resultant mixture, the liquid to be tested being immiscible with the mixture.

6. The method of measuring the specific gravity of a liquid which comprises immersing the same in carbon tetrachloride introducing a light petroleum distillate adjacent the bottom of the carbon tetrachloride until the mixture approaches the specific gravity of the liquid to be tested, stopping the introduction of petroleum distillate when the liquid to be tested is suspended approximately midway the top and bottom of the mixture, and measuring the specific gravity of the resultant mixture, said liquid to be tested being immiscible with the mixture.

7. The combination with a liquid mixing vessel, of a liquid container, means providing a passageway joining the vessel and container adjacent the bottom of each, and a valve located in said passageway adapted to close both the vessel and container, and provided with two channels therein, one of which is adapted to connect the vessel and container, the other of which is adapted to provide external communication with either the vessel or container, said container being elevated above the vessel in order that the liquid therein may have a greater head at the valve than the liquid in the vessel.

8. The combination with a liquid mixing vessel, of a liquid container, means providing a passageway joining the container with the bottom of the vessel, a liquid in said vessel, another liquid in the container of less specific gravity than the first liquid but under sufficient pressure to enable the second liquid to enter the bottom of the vessel and intermix with the first liquid, and a two way valve in said passageway adapted to connect the vessel and container, to drain either, or to close both.

In testimony, that I claim the invention set forth above I have hereunto set my hand this 13th day of September, 1920.

WILLIAM G. EXTON.

Witnesses:
GEORGE D. RICHARDS,
HARRY VERNET.